UNITED STATES PATENT OFFICE.

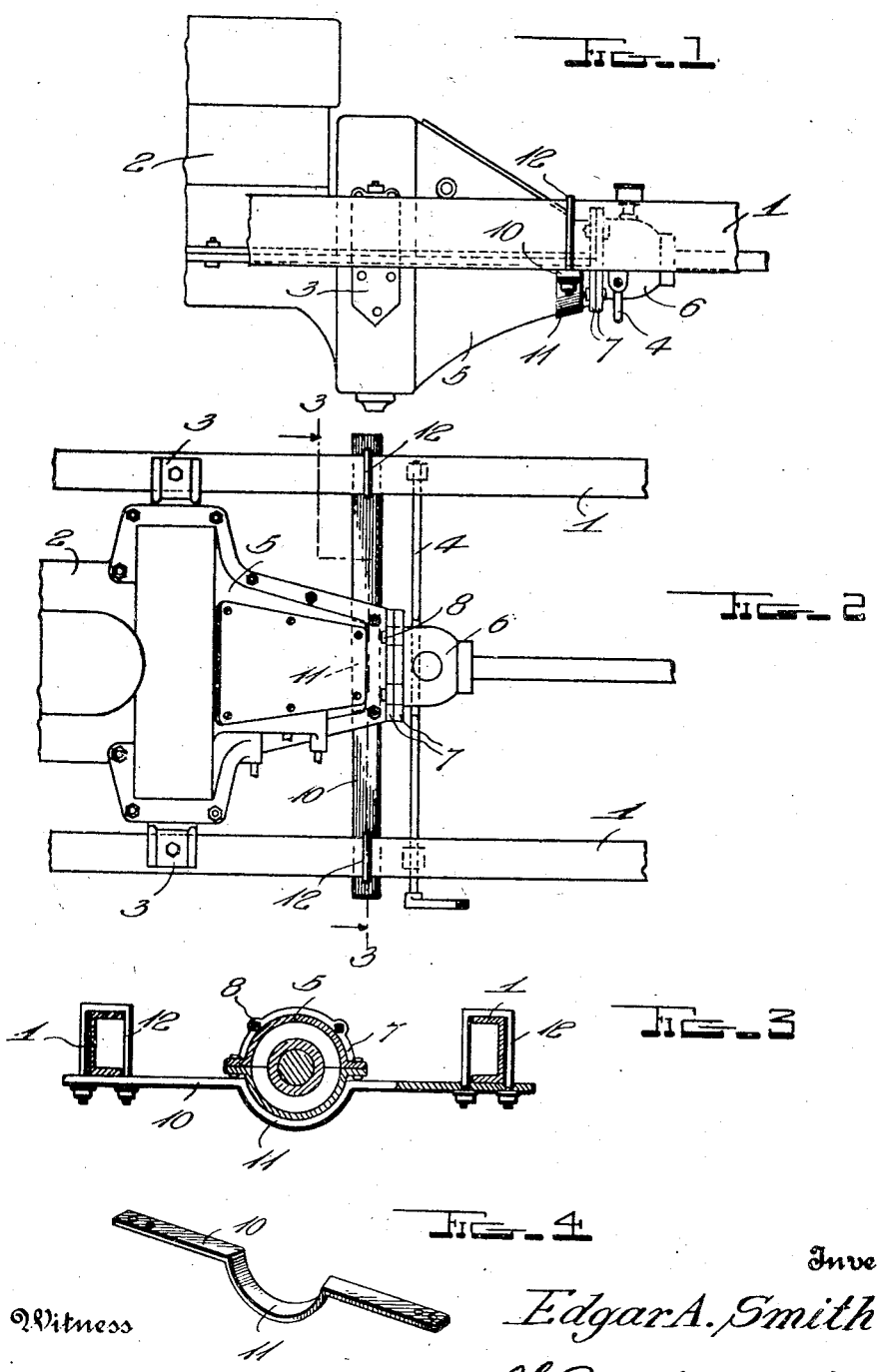

EDGAR A. SMITH, OF WINDSOR, NORTH CAROLINA.

UNIVERSAL-JOINT BRACE.

1,274,619.	Specification of Letters Patent.	Patented Aug. 6, 1918.

Application filed March 21, 1918. Serial No. 223,765.

*To all whom it may concern:*

Be it known that I, EDGAR A. SMITH, a citizen of the United States, residing at Windsor, in the county of Bertie and State of North Carolina, have invented certain new and useful Improvements in Universal-Joint Braces; and I do declare the following to be a full, clear, and exact description of the invention, such as will enable others skilled in the art to which it appertains to make and use the same.

My invention has for its object to provide a simple and inexpensive, yet an efficient and durable brace for the universal joint and transmission casings of automobiles employing a unit power plant, the device being intended primarily for use upon Ford cars although it is not restricted to use upon this machine. By the use of the device, breakage of the rear motor hangers and excessive vibration of the motor are prevented.

With the foregoing object in view, the invention resides in the brace and its manner of application as herein described and claimed, and shown in the accompanying drawing in which:

Figure 1 is a side elevation of a portion of the power unit and chassis frame showing the brace applied;

Fig. 2 is a top plan view of the parts seen in Fig. 1;

Fig. 3 is a transverse sectional view on the planes of the line 3—3 of Fig. 2; and Fig. 4 is a perspective view of the brace.

In the drawing above briefly described, the numeral 1 designates a portion of the chassis frame, 2 indicates the unit power plant as a whole, 3 has reference to the rear plant as a whole, 3 has reference to the rear hangers for said power plant, and 4 designates the transverse controller shaft. The power plant 2 includes a transmission and clutch housing 5 tapering toward its rear end into substantially cone-shape and having a universal joint casing 6 at its rear end, this casing being connected to the housing 5 by outstanding flanges 7 secured together by bolts or the like 8. Casing 6 is located over the depressed central portion of the shaft 4 and when breakage of the hangers 3 occurs, (and this often happens under severe strain), the power unit drops onto and is supported at its rear end by said shaft. This renders the car useless until new hangers can be applied and in addition to the time, expense and trouble incurred, it is practically impossible to rivet these new hangers in place sufficiently tight to prevent leakage of oil from housing 5 through the rivet holes.

In addition to the foregoing features of disadvantage, the hangers 3 are now commonly made from metal stampings and are therefore sufficiently springy to permit an excessive amount of vibration. My invention however overcomes all of these difficulties by providing an auxiliary support for the rear end of the power unit and a seat therefor which will not permit any lateral movement or vibration.

In the form of the invention shown, a rigid bar 10 is depressed at its center to form a U-shaped seat 11 for the rear end of the housing 5, said bar extending transversely beneath said housing and the frame 1 and being secured to the latter by U bolts 12. The seat 11 decreases in diameter toward the rear edge of the bar to snugly contact with the housing 5 and said seat engages said housing immediately in front of the flanges 7. The housing 5 is not secured to the seat 11 but the latter serves as an effective support to relieve the hangers 3 of strain and due to its shape, absolutely prevents lateral vibration of the transmission housing and universal joint casing, thus assisting in stabilizing the entire power unit.

It will also be observed that since the seat 11 abuts the inclined bottom of the transmission casing 5, it will prevent the entire power unit from having any tendency to shift rearwardly in respect to the frame. Also, if the seat is placed snugly against one of the flanges 7 or against the flange bolts, the power unit will be similarly braced against forward shifting.

The above described form of the invention is extremely simple and inexpensive, may be easily and quickly attached, and is highly efficient and durable. For these reasons, this form is preferable, but within the scope of the invention, as claimed, numerous minor changes may well be made.

I claim:

In combination with the side bars of an automobile chassis frame, and a power unit mounted between said bars, said unit having at its rear end a rearwardly tapering transmission casing provided with an inclined bottom and terminating at its contracted rear end in a flanged universal joint casing, a transverse bar having its center bowed downwardly under said contracted casing end immediately in advance of the flange of said universal joint casing, said downwardly bowed portion of the bar snugly receiving said rear end of the transmission casing to support the same and hold the entire power unit against rearward shifting, and clamps for securing the ends of said transverse bar to the side bars of the chassis frame.

In testimony whereof I have hereunto set my hand in the presence of two subscribing witnesses.

EDGAR A. SMITH.

Witnesses:
J. H. TADLOCK,
E. V. GASKINS.